(12) United States Patent
Lu et al.

(10) Patent No.: US 10,187,381 B2
(45) Date of Patent: Jan. 22, 2019

(54) DEVICE AND SYSTEM OPERATING METHOD FOR ONLINE ACTIVATION OF MOBILE TERMINAL TOKEN

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 65 days.

(21) Appl. No.: 15/533,713

(22) PCT Filed: Nov. 23, 2015

(86) PCT No.: PCT/CN2015/095278
§ 371 (c)(1),
(2) Date: Jun. 7, 2017

(87) PCT Pub. No.: WO2016/107333
PCT Pub. Date: Jul. 7, 2016

(65) Prior Publication Data
US 2018/0332472 A1    Nov. 15, 2018

(30) Foreign Application Priority Data

Dec. 29, 2014    (CN) .......................... 2014 1 0837958

(51) Int. Cl.
H04W 12/06        (2009.01)
H04L 29/06        (2006.01)
(Continued)

(52) U.S. Cl.
CPC .......... *H04L 63/083* (2013.01); *H04L 9/3213* (2013.01); *H04W 12/04* (2013.01); *H04L 67/10* (2013.01)

(58) Field of Classification Search
CPC ..................................................... H04W 12/06
(Continued)

(56) References Cited

U.S. PATENT DOCUMENTS 9,032,498 B1 * 5/2015 Ben Ayed ............... G06F 21/35
726/9
2014/0122873 A1 5/2014 Deutsch et al.
(Continued)

OTHER PUBLICATIONS

Leonid Batyuk et al. "Multi-Device Key Management Using Visual Side Channels in Pervasive Computing Environments"; 2011 International Conference on Broadband and Wireless Computing, Communication and Applications 2011 IEEE pp. 207-214 (Year: 2011).*

*Primary Examiner* — Khalil Naghdali
(74) *Attorney, Agent, or Firm* — Hammer & Associates, P.C.

(57) ABSTRACT

A device and method for online activation of a mobile terminal token related to cloud authentication management is disclosed. The method generally includes: a first activation request sent by the cloud authentication management platform, the cloud authentication server generates a first activation response and sends same to the cloud authentication management platform; the cloud authentication management platform sends the first activation response to the terminal; when the mobile terminal token obtains the first activation response, the token accesses the cloud authentication server and establishes a network data link; the mobile terminal token and the cloud authentication server send data and carry out activation.

21 Claims, 5 Drawing Sheets

(51) Int. Cl.
*H04W 12/04* (2009.01)
*H04L 9/32* (2006.01)
*H04L 29/08* (2006.01)

(58) Field of Classification Search
USPC .......................................................... 726/7
See application file for complete search history.

(56) References Cited

U.S. PATENT DOCUMENTS

| | | | |
|---|---|---|---|
| 2015/0178724 A1* | 6/2015 | Ngo ...................... | H04L 9/0869 |
| | | | 705/71 |
| 2015/0180849 A1* | 6/2015 | Nesic .................. | H04L 63/0815 |
| | | | 726/6 |
| 2016/0134599 A1* | 5/2016 | Ross ....................... | H04L 63/08 |
| | | | 713/168 |
| 2018/0189783 A1* | 7/2018 | Flurscheim ......... | G06Q 20/3821 |
| 2018/0232526 A1* | 8/2018 | Reid ..................... | G06F 21/602 |
| 2018/0232722 A1* | 8/2018 | Wong .................. | G06Q 20/327 |

* cited by examiner

DEVICE AND SYSTEM OPERATING METHOD FOR ONLINE ACTIVATION OF MOBILE TERMINAL TOKEN

FIELD OF THE INVENTION

The present invention relates to a working method of a device and a system for online activating mobile terminal token, which belongs to information security technology field, and more particularly, is used in a system which is made up of a cloud authentication management platform, a cloud authentication server, a terminal and a mobile terminal token.

BACKGROUND OF THE INVENTION

A mobile terminal token, whose fully name is dynamic password mobile terminal token, is a mobile terminal software for generating dynamic password. The mobile terminal token generates a dynamic password by a program run at a mobile terminal, identity is authenticated by binding the dynamic password with the mobile terminal and no communication and fee is generated in a process of generating the password, which has advantages such as simple usage, high security, low cost, requiring no extra device, easy obtaining and no logistic, etc. The mobile token is developing trend for dynamic password identity authentication of 3G.

OTP cloud authentication center deployed on internet is based on identity authentication platform of SaaS mode, which provides reliable infrastructure for individual, family or entrepreneur. The OTP cloud authentication center provides independent OTP service based on cloud for a website and strengthens security of logging on a website greatly by simple integration and using free mobile terminal token.

Two-dimensional code, so called two-dimensional barcode, is a graphical image on which special geometrical figures are distributed in black and white regularly. The two-dimensional code is a key of all information data and used widely.

In prior art, when a two-dimensional code is scanned, sensitive information will be obtained from the two-dimensional code directly in a process of activating the mobile terminal token, of which security is low.

SUMMARY OF THE INVENTION

The object of the present invention is to provide a working method for device and system of online activating mobile terminal token, which can implement security interaction between a mobile terminal token and a cloud authentication server in a process of activating the mobile terminal token, and realizes activation of the mobile terminal token and improves security in the process of activating the mobile terminal token.

Therefore, according to one aspect of present invention, there is provided a working method for a system of online activating mobile terminal token, which comprises:

Step S1, receiving, by a cloud authentication server, a first activation request from a cloud authentication management platform, generating a first activation response upon the first activation request and returning the first activation response to the cloud authentication management platform;

Step S2, sending, by the cloud authentication management platform, the first activation response to a terminal;

Step S3, after receiving the first activation response from the terminal, accessing, by the mobile terminal token, the cloud authentication server upon the first activation response, generating a second activation response request upon the first activation response and sending the second activation response request to the cloud authentication server;

Step S4, after receiving the second activation request, generating, by the cloud authentication server, a token sequence number and a seed generating factor, generating a server seed key upon the seed generating factor and storing the token sequence number and the server seed key;

Step S5, upon the token sequence number and the seed generating factor, generating, by the cloud authentication server, a second activation response, and sending the second activation response back to a mobile terminal token;

Step S6, obtaining, by the mobile terminal token, the seed generating factor and the token sequence number from the second activation response, generating a token seed key upon the seed generating factor and storing the token sequence number and the token seed key;

Step S7, computing, by the mobile terminal token, the token seed key and a built-in dynamic factor, generating the dynamic password, generating a third activation request upon the dynamic password and sending the third activation request to the cloud authentication server;

Step S8, obtaining, by the cloud authentication server, a dynamic password from the received third activation request, obtaining and storing the server seed key, computing the server seed key and the built-in dynamic factor, generating the dynamic password, determining whether the generated dynamic password matches the obtained dynamic password, if yes, execute Step S10; otherwise, sending the third activation response of failed activation to the mobile terminal token; ending; and Step S9, generating, by the cloud authentication server, the third activation response of successful activation, sending the third activation response back to the terminal token, activation being successful.

Preferably, the cloud authentication management platform and the cloud authentication server are set in a device or different devices.

Preferably, in Step S1, generating the first activation response upon the first activation request specifically comprises: invoking, by the cloud authentication server, a random number generating function, generating a first random number, taking the first random number as the activation request ID and stores the activation request ID, generating the first activation response upon the activation request ID;

in Step S3, generating the second activation request upon the first activation response specifically comprises: obtaining, by the mobile terminal token, the activation request ID from the first activation response and storing the activation request ID, generating the second activation request upon the activation request ID;

in Step S4, after receiving the second activation request, the method further comprises: obtaining, by the cloud authentication server, the activation request ID from the second activation request, determining whether the activation request ID is identical to the stored activation request ID, if yes, going on subsequent operation; otherwise, reporting error and ending the procedure;

in Step S5, generating the second activation response upon the token sequence number and the seed generating factor specifically comprises: generating, by the cloud authentication server, the second activation response upon the token sequence number, the seed generating factor and the activation request ID; and between Step S5 and Step S6, the method further comprises: obtaining, by the mobile terminal token, the activation request ID from the second activation response, determining whether the activation request ID is identical to the stored activation request ID, if yes, executing Step S6; otherwise, reporting error and ending the procedure.

Preferably, in Step S1, generating the first activation response upon the first activation request specifically comprises:

Step a1, obtaining, by the cloud authentication server, the user number from the first activation request;

Step a2, obtaining, by the cloud authentication server, an enterprise identification corresponding to the username, generating the first activation response upon a preset prefix identification, a preset domain, the enterprise identification and the activation request ID; and in Step S3, accessing the cloud authentication server upon the first activation response specifically comprises: obtaining, by the mobile terminal token, the preset domain and the enterprise identification from the first activation response, obtaining the terminal port number, obtaining a URL for activation upon the preset domain, the enterprise identification and the terminal port number, accessing the cloud authentication server via the URL for activation, building network data link with the cloud authentication server.

Preferably, after generating the first random number, Step S1 further comprises: obtaining and recording, by the cloud authentication server, server system time; and Step S4 further comprises: obtaining, by the cloud authentication server, current server system time, determining whether different between the current server system time and the recorded server system time is in a preset category, if yes, gonging on subsequent operation; otherwise, deleting the stored activation request ID.

Preferably, in Step S3, generating the second activation request upon the first activation response specifically comprises: obtaining, by the mobile terminal token, a stored token identification code and a token version number, invoking a system type obtaining function, obtaining the type of the mobile terminal system, generating the second activation request upon the token identification code, the token version number and the type of the mobile terminal system; and after receiving the second activation request in Step S4, the method further comprises: obtaining, by the cloud authentication server, the token identification code, the token version number and the type of the mobile terminal system from the second activation request, obtaining the stored token identification code, token version number and type of the mobile terminal system, determining whether they are matched, if yes, going on subsequence operation, otherwise, reporting error and ending the procedure.

Preferably, in Step S5, generating the second activation response upon the token sequence number and the seed generating factor specifically comprises: encrypting, by the cloud authentication server, the seed generating factor with the token identification number, obtaining the encrypted seed generating factor, generating the second activation response upon the token identification code and the encrypted seed generating factor; and in Step S6, obtaining the seed generating factor and the token sequence number from the second activation response specifically comprises: obtaining, by the cloud authentication server, the token sequence number and the encrypted seed generating factor from the second activation response, decrypting the encrypted seed generating factor with the token identification code and obtaining the seed generating factor.

Preferably, before Step S1, the method further comprises:

Step b1, waiting, by the cloud authentication management platform, for receiving a user record, which is selected by the administrator, required to be activated;

Step b2, generating, by the cloud authentication management platform, the first activation request upon the username in the user record; and Step b3, sending, by the cloud authentication management platform, the first activation request to the cloud authentication server.

Preferably, before Step b1, the method further comprises:

Step c0, setting, by the cloud authentication management platform, times of failed password authentication as an initial value;

Step c1, waiting, by the cloud authentication management platform, for an administrator to input an administrator account and a password;

Step c2, determining, by the cloud authentication management platform, whether the administrator account and the password input by the administrator are correct, if yes, executing Step c1; otherwise, executing Step c3; and Step c3, updating, by the cloud authentication management platform, times of failed password authentication, determining whether the times of failed password authentication reaches a preset times, if yes, reporting error and locking the cloud authentication management platform; otherwise, going back to Step c1.

Preferably, before Step b1, the method further comprises: receiving, by the cloud authentication management platform, an activation button clicked by the administrator, obtaining last activation time and current system time, determining whether different between the last activation time and the current system time is more than a preset time period, if yes, permitting reactivation and executing Step b2; otherwise, returning a response indicating activation is done, ending the procedure;

Step b2 specifically is: upon the username and the reactivation identification in the user record, generating, by the cloud authentication management platform, the first activation request;

Step S1 further comprises: recording, by the cloud authentication server, the reactivation identification; and Step S4 specifically comprises: determining, by the cloud authentication server, whether the reactivation identification is recorded, if yes, generating the seed generating factor; otherwise, generating the token sequence number and the seed generating factor.

Preferably, Step S9 further comprises: obtaining the current system time, taking the current system time as last activation time and storing the last activation time.

Preferably, Step S2 specifically comprises:

Step S2-1, receiving, by the cloud authentication management platform, the first activation response, and generating a two-dimensional code image upon the first activation response;

Step S2-2, obtaining, by the cloud authentication management platform, a corresponding mail account, sending the two-dimensional code image to the mobile terminal via a mail upon the mail account;

Step S2-3, displaying, by the terminal, the received two-dimensional image; and in Step S3, obtaining, by the mobile terminal token, the first activation response specifically is: receiving and scanning, by the mobile terminal, the two-dimensional image, analyzing the two-dimensional image and obtaining the first activation response.

Preferably, Step S2 specifically comprises: obtaining, by the cloud authentication management platform, a terminal number, sending the first activation response to the terminal corresponding to the terminal number via a short message upon the terminal number; and in Step S3, obtaining, by the mobile terminal token, the first activation response specifically is: activating, by the mobile terminal, the data receiving mechanism, receiving the first activation response.

Preferably, Step S4 specifically comprises:

Step d1, invoking, by the cloud authentication server, a random number generating function, generating a second random number and taking the second random number as seed generating factor, generating a token sequence number upon a token sequence number generating algorithm and storing the token sequence number;

Step d2, using, by the cloud authentication server, a preset derivation algorithm, performing derivation on the seed generating factor and obtaining the server seed key; and Step d3, obtaining, by the cloud authentication server, an enterprise key, encrypting the server seed key with the enterprise key, obtaining and storing the encrypted server seed key.

Preferably, in Step S8, obtaining the stored server seed key, computing the server seed key and generating the dynamic password specifically comprises:

Step e1, obtaining, by the cloud authentication server, the corresponding enterprise key and the encrypted server seed key;

Step e2, upon the enterprise key, using, by the cloud authentication server, a preset decryption algorithm to decrypt the encrypted server seed key and obtaining the server seed key; and Step e3, computing, by the cloud authentication server, the server seed key and the built-in dynamic factor with a password generating algorithm and generating the dynamic password.

Preferably, before obtaining the corresponding enterprise key, the method further comprises:

Step f1, receiving, by a key maintenance platform, an administrator key of a key holder;

Step f2, performing, by the key maintenance platform, preset computing on the administrator key, obtaining a master key and storing the master key;

Step f3, obtaining, by the cloud authentication server, the master key from the key maintenance platform regularly, obtaining whether the obtained master key is identical to the stored master key, if yes, executing Step f4; otherwise, updating the stored master key with the obtained master key; executing Step f4; and Step f4, obtaining, by the cloud authentication server, a corresponding enterprise ID, performing hash operation on the master key and the enterprise ID, obtaining the enterprise key and storing the enterprise key.

Preferably, Step S6 specifically comprises:

Step S6-1, obtaining, by the mobile terminal token, the seed generating factor and the token sequence number from the second activation response, Step S6-2, generating, by the mobile terminal token, the token seed key upon the seed generating factor; and Step S6-3, encrypting, by the mobile terminal token, the token seed key with the token sequence number, obtaining the encrypted token seed key, storing the encrypted token seed key and the token sequence number.

Preferably, in Step S7, computing the token seed key and generating the dynamic password specifically comprises:

Step S7-1, decrypting, by the mobile terminal token, the encrypted token seed key with the token sequence number, obtaining the token seed key; and Step S7-2, using, by the mobile terminal token, a password generating algorithm, computing the token seed key and built-in dynamic factor, generating the dynamic password.

Preferably, after Step S9, the method further comprises: after receiving the third activation response, determining, by the mobile terminal token, the third activation response, if the third activation response is a response of successful activation, the activation being successful, ending the procedure; if the third activation response is a response of failed activation, deleting the token seed key, the activation being failed and ending the procedure.

According to another aspect of the present invention, there is provided a working method for a cloud authentication server in a system of online activating mobile terminal token, which comprises:

Step T1, receiving, by the cloud authentication server, a first activation request from a cloud authentication management platform, generating a first activation response upon the first activation request, sending the first activation response to the mobile terminal token;

Step T2, receiving, by the cloud authentication server, a second activation request sent from the mobile terminal token, generating a token sequence number and a seed generating factor, generating a server seed key upon the seed generating factor and storing the token sequence number and the server seed key;

Step T3, generating, by the cloud authentication server, a second activation response upon the token sequence number and the seed generating factor, returning the second activation response to the mobile terminal token via network data link;

Step T4, receiving, by the cloud authentication server, a third activation request sent from the mobile terminal token, obtaining a dynamic password from the third activation request, obtaining the stored server seed key, computing the server seed key and generating a dynamic password;

Step T5, determining, by the cloud authentication server, whether the generated password matches the obtained dynamic password, if yes, executing Step T6; otherwise, returning a third activation response of failed activation to the mobile terminal toke, ending the procedure; and Step T6, generating, by the cloud authentication server, a third activation response of successful activation and returning the third activation response to the mobile terminal token, activation being successful.

Preferably, in Step T1, generating the first activation response upon the first activation request, sending the first activation response to the mobile terminal token specifically comprises:

Step T1-1, obtaining, by the cloud authentication server, a username from the first activation request, Step T1-2, obtaining, by the cloud authentication server, a prefix identification, a preset domain and an enterprise identification which are corresponds to the username; and Step T1-3, generating, by the cloud authentication server, the first activation response upon the username, the prefix identification, the preset domain and the enterprise identification, transferring the first activation response to the mobile terminal toke via a cloud authentication management platform and a terminal Preferably, before Step T2, the method further comprises: determining, by the cloud authentication server, whether a reactivation identification can be obtained from the first activation request, if yes, recording the reactivation identification, executing Step T2; otherwise, executing Step T2 directly; and Step T2 specifically comprises: receiving, by the cloud authentication server, the second activation request sent from the mobile terminal token, determining whether the reactivation identification is recorded, if yes, generating the seed generating factor, generating the server seed key upon the seed generating factor and storing the server seed key; otherwise, generating the token sequence number and the seed generating factor, generating the server seed key upon the seed generating factor, storing the token sequence number and the sever seed key.

Preferably, Step T2 specifically comprises:

Step T2-1, receiving, by the cloud authentication server, the second activation request sent from the mobile terminal token, invoking a random number generating function, generating a second random number, taking the second random number as the seed generating factor, generating the token sequence number upon a token sequence number generating algorithm and storing the token sequence number;

Step T2-2, using, by the cloud authentication server, a preset derivation algorithm, performing derivation on the seed generating factor and obtains the server seed key; and Step T2-3, obtaining, by the cloud authentication server, an enterprise key, encrypting the server seed key with the enterprise key, obtaining the encrypted server seed key and storing the encrypted server seed key.

Preferably, in Step T4, obtaining the stored server seed key, computing the server seed key and generating the dynamic password specifically comprises:

Step T4-1, obtaining, by the authentication server, the corresponding enterprise key and the encrypted server seed key;

Step T4-2, decrypting, by the cloud authentication server, the encrypted server seed key upon the enterprise key by using a preset decrypting algorithm and obtaining the server seed key; and Step T4-3, computing, the cloud authentication server, the server seed key and a built-in dynamic factor and generating the dynamic password.

Preferably, in Step T3, generating the second activation response upon the token sequence number and the seed generating factor specifically is: obtaining, by the cloud authentication server, the stored token identification code, encrypting the seed generating factor with the token identification code, obtaining the encrypted seed generating factor, generating the second activation response upon the token identification code and the encrypted seed generating factor.

According to another aspect of the present invention, there is provided a working method for a mobile terminal token of a system of online activating mobile terminal token, which comprises:

Step X1, receiving, by the mobile terminal token, a first activation response from a cloud authentication server, accessing the cloud authentication server upon the first activation response, building network data link with the cloud authentication server, generating a second activation request upon the first activation response, sending the network data link to the cloud authentication server;

Step X2, receiving, by the mobile terminal token, a second activation response sent from the cloud authentication server, obtaining a seed generating factor and a token sequence number from the second activation response, generating a token seed key upon the seed generating factor, storing the token sequence number and the token seed key;

Step X3, computing, by the mobile terminal token, the token seed key, generating a dynamic password, generating a third activation request upon the dynamic password, sending the third activation request to the cloud authentication server via the network data link; and Step X4, receiving, by the mobile terminal token, a third activation response returned from the cloud authentication server, determining whether the third activation response, if the third activation response is failed response, deleting the token seed key, activation being failed, ending the procedure; if the third activation response is successful response, activation is successful, ending the procedure.

Preferably, in Step X1, accessing the cloud authentication server upon the first activation response, building network data link with the cloud authentication server specifically is: obtaining, by the mobile terminal token, a preset domain and an enterprise identification from the first activation response, obtaining a terminal port number, obtaining an URL for activation upon the preset domain, the enterprise identification and the terminal port number, accessing the cloud authentication server via the URL for activation and building the network data link with the cloud authentication server.

Preferably, in Step X1, receiving, by the mobile terminal token, the first activation response from the cloud authentication server specifically is: receiving, by the mobile terminal, a two-dimensional image generated upon the first activation response, analyzing the second two-dimensional image to obtain the first activation response.

Preferably, in Step X1, receiving, by the mobile terminal token, the first activation response from the cloud authentication server specifically is: activating, by the mobile terminal token, a data receiving mechanism, receiving the first activation response when detecting received data including a prefix identification.

Preferably, generating the second activation request upon the first activation response specifically is: obtaining, by the mobile terminal token, a stored token identification code and token version number, invoking a system type obtaining function, obtaining a type of the mobile terminal system, generating the second activation request upon the token identification code, the token version number and the type of the mobile terminal system.

Preferably, Step X2 specifically includes:

Step X2-1, receiving, by the mobile terminal token, the second activation response sent from the cloud authentication server, obtaining the seed generating factor and the token sequence number form the second activation response;

Step X2-2, generating, by the mobile terminal token, the token seed key upon the seed generating factor; and Step X2-3, encrypting, by the mobile terminal token, the token seed key with the token sequence number, obtaining the encrypted token seed key, and storing the encrypted token seed key and the token sequence number.

Preferably, in Step X3, computing, by the mobile terminal token, the token seed key, generating a dynamic password specially comprises:

Step X3-1, decrypting, by the mobile terminal token, the encrypted token seed key by means of the token sequence number, so as to obtain the token seed key; and Step X3-2, computing, by the mobile terminal token, the token seed key and a built-in dynamic factor with a password generating algorithm, so as to generate a dynamic password.

According to the present invention, security interaction can be implemented between a mobile terminal token and a cloud authentication server in a process of activating the mobile terminal token, which realizes activation of the mobile terminal token and improves security in the process of activating the mobile terminal token.

DETAILED DESCRIPTION OF THE PRESENT INVENTION

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those skilled in the art without any creative work belong to the scope of the disclosure.

The present invention is applied in a system formed by a cloud authentication management platform, a cloud authentication server, a terminal, a mobile terminal token. When using a method of two-dimensional code authentication, the terminal specifically is a terminal device, which can receive mail, such as a PC (Personal Computer), an iPad, a cellphone, a terminal device without loaded the mobile terminal token, etc. when using a method of short message authentication, the terminal specifically is a token with loaded mobile terminal token, such as a cellphone, etc.

In the present invention, the server seed key and the token seed key can be stored after being encrypted or be stored directly. Embodiment 1 is implemented by storing the encrypted server seed key and the encrypted token seed key; Embodiment 2 and Embodiment 3 are implemented by storing the server seed key and the token seed key directly; in this case, the way for encrypting the seed key can be used by respective devices independently, i.e. the server seed key is stored directly and the token seed key is stored after being encrypted, etc.

Embodiment 1

Figure 1:
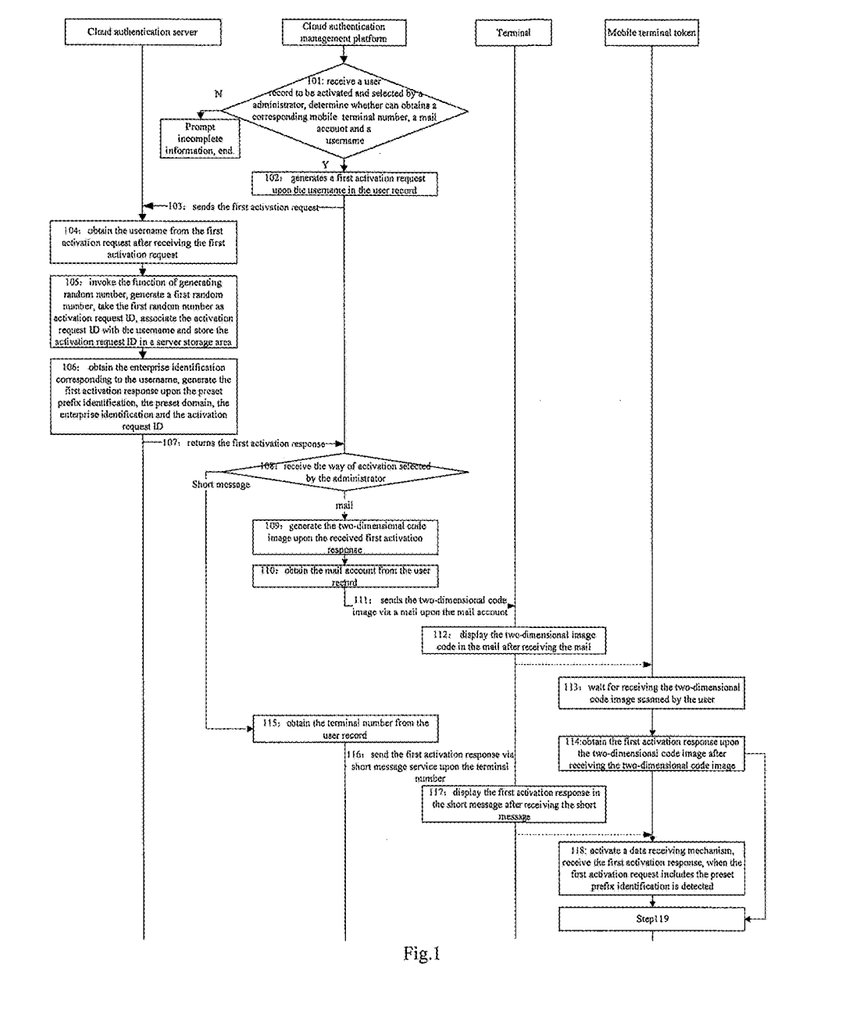
FIG. 1, FIG. 2 and FIG. 3 present flow diagrams of a working method for a system of device and system of online activating mobile terminal token according to Embodiment 1 of the present invention.
Figure 2:
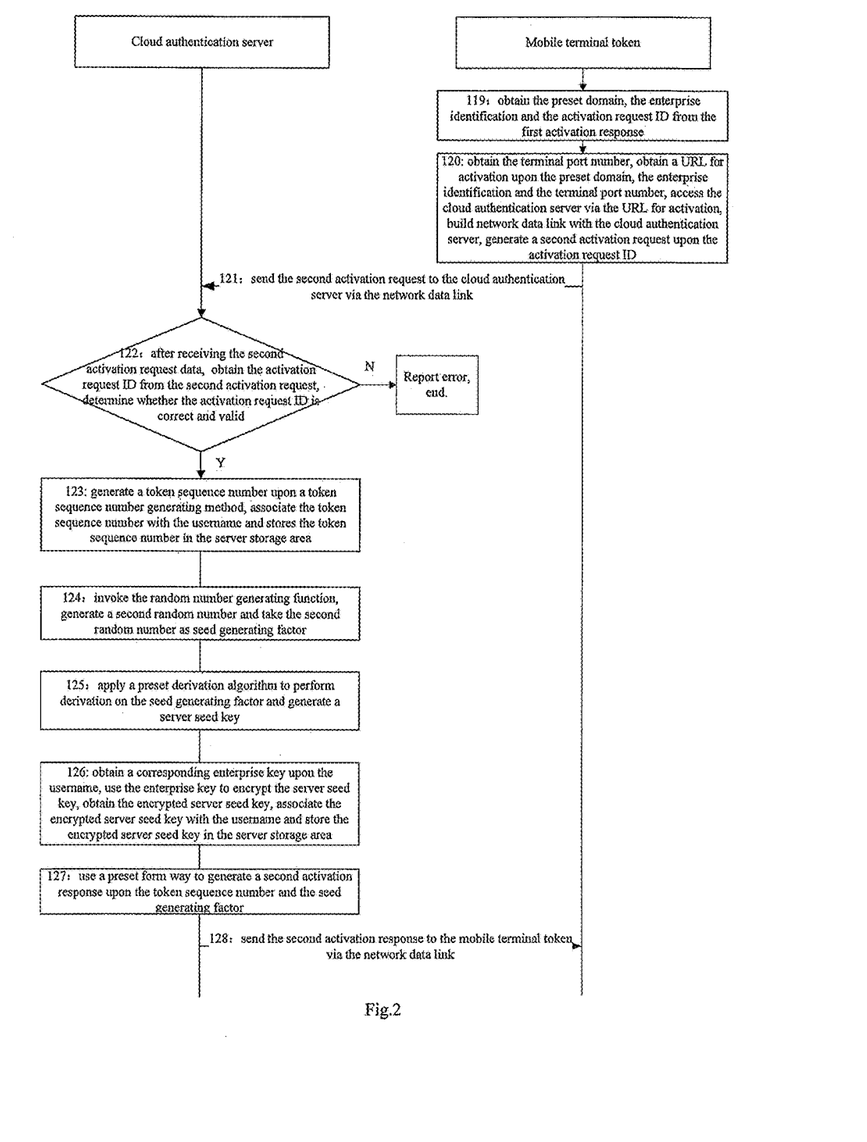
Figure 3:
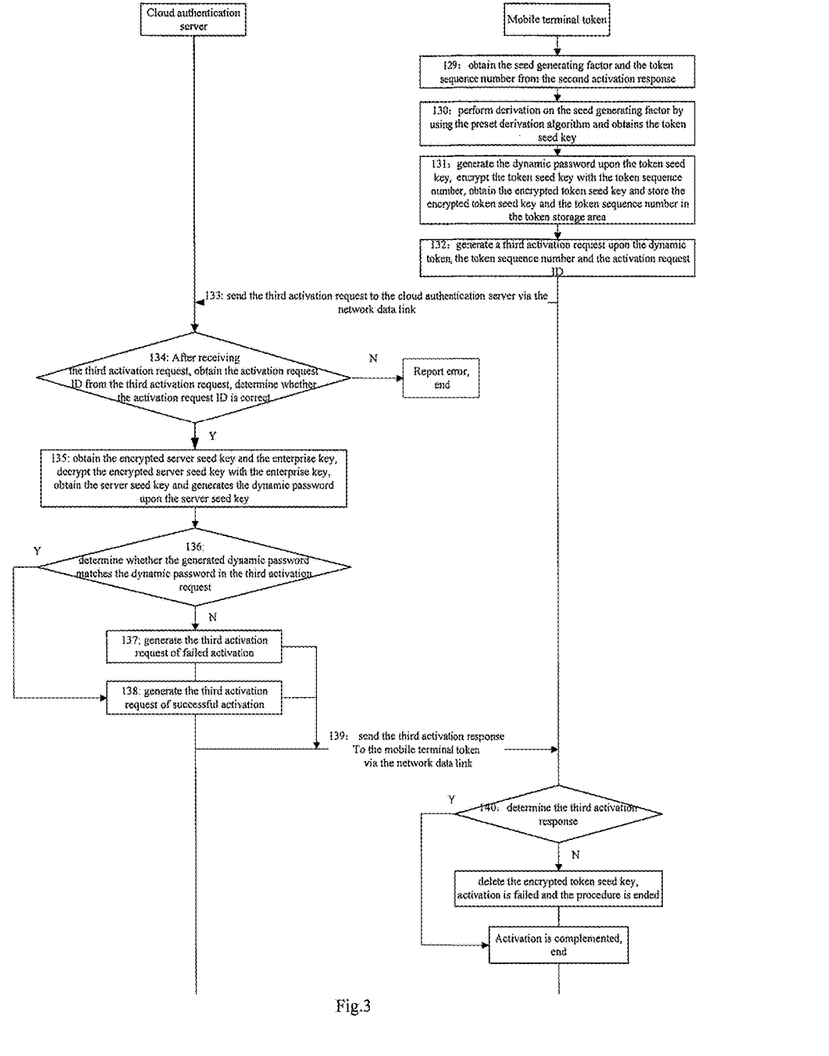

As shown in FIG. 1, FIG. 2 and FIG. 3, Embodiment 1 of the present invention provides a working method for a system of online activating mobile terminal token, which includes:

Step 101, the cloud authentication management platform receives a user record, which is required to be activated and selected by a administrator, determining whether a mobile terminal number, a mailbox account and a username which are corresponding to the user record, can be obtained, if yes, execute Step 102; otherwise, prompt that information is not incomplete; then procedure is ended;

in Embodiment 1, Step 101 further includes determining whether a token identification code and a mobile terminal system version which are corresponding to the user record are obtained, if yes, executing Step 103; otherwise prompt that information is incomplete; procedure is ended;

in this case, when the cloud authentication management requires a user to enter the token identification code and the mobile terminal system version when a user is registered;

for example, the cloud authentication management platform receives the user record selected by the administrator is as the following:
User name: abc
User maibox: 123456789@163.com
Mobile telephone number: 18912345678
Token identification code: 57987117827971672588
Mobile terminal system version: 1

Further, in Embodiment 1, before Step 101 the method further includes:

A, the cloud authentication management platform waits for receiving an administrator account number and a password which are input by the administrator;

B, the cloud authentication management platform determines whether the received administrator account number and a password which are input by the administrator are correct, if yes, execute Step 101; otherwise, execute Step C; and C, the cloud authentication management platform updates times for failed password authentication and determines whether the updated times for failed password authentication reaches a preset times, if yes, report error and lock the cloud authentication management platform; otherwise, go back to Step A;

Further, the way of administrator authentication, for example, account password authentication or two-factor authentication, can be configured in advance; a process of two factor authentication includes authenticating the account password is firstly; when the account password is matched, displaying a button for obtaining a short message password and an input box for imputing short message password; when the administrator clicks the button for obtaining the short message password, waiting for the short password input by the administrator; determining whether the short message password is correct when the short message password is received; determining whether the short message password is correct; if yes, logon is successful, executing Step 103; otherwise, accumulating times for short message password authentication; when the times reaches a preset times, preferably, 10 times, locking the cloud authentication management platform temporarily, the unlocking the cloud authentication management platform with a regular time interval, preferably 30 minutes;

Step 102, the cloud authentication manage platform generates a first activation request upon the username in the user record;

before Step 102, the method further includes:

Step 102-1, the cloud authentication management platform receives the activation button clicked by the administrator;

Step 102-2, the cloud authentication management platform determines whether last time of activation can be obtained, if yes, execute Step 102-3; otherwise, execute Step 102;

Step 102-3, the cloud authentication management platform obtains a current system time, determines whether different between the current system time and the time of last activation is more than a preset time period, if yes, execute Step 102-4; otherwise, return a response of no repeatable activation; the procedure is ended;

Step 102-4, the cloud authentication management platform generates a first activation request upon the username and a reactivation identification; execute Step 103;

Step 103, the cloud authentication management platform sends the first activation request to the cloud authentication server;

Step 104, the cloud authentication management obtains the username from the first activation request after receiving the first activation request;

Step 105, the cloud authentication server invokes the function of generating random number, generates a first random number, takes the first random number as activation request ID, associates the activation request ID with the username and stores the activation request ID in a server storage area;

in Embodiment 1, preferably, in order to assure security, it requests that the two-dimensional code image is valid in a preset time period. Therefore, after generating the activation request ID, the cloud authentication server stores the activation request ID in the server storage area and records the system time of the server;

for example, the generated activation request ID is fasdcvxvdsafdsfzcxcsdfsdafcxz; the recorded system time of server is 1417502570;

Step 106, the cloud authentication server obtains the enterprise identification corresponding to the username, generates the first activation response upon the preset prefix identification, the preset domain, the enterprise identification and the activation request ID;

in Embodiment 1, the preset prefix identification is yunxin://, the preset domain is: api-6 digits of enterprise identification.cloudentify.com;

the generated first activation response is:

--- yunxin://api-6 digits of enterprise identification.cloudentify.com?reqid=activation requestID;

--- for example, the cloud authentication server, upon the prefix identification yunxin://, obtains the enterprise identification dfserv, the preset domain name api-6 digits of enterprise identification.cloudentify.com and activation request ID fasdcvxvdsafdsfzcxcsdfsdafcxz;

the generated first activation response is:
yunxin://api-dfserv.cloudentify.com?reqid=fasdcvxvdsafdsfzcxcsdfsdafcxz;

Step 107, the cloud authentication server returns the first activation response to the cloud authentication management platform;

Step 108, the cloud authentication management platform receives the way of activation selected by the administrator, execute Step 109 if the way of activation selected by the administrator is way of activation by mail; execute Step 115, if the way of activation selected by the administrator is way of activation by short message;

Step 109, the cloud authentication management platform generates the two-dimensional code image upon the received first activation response;

specifically, the cloud authentication management platform invokes a function of generating two-dimensional image upon the first activation response and generates the two-dimensional code image;

Step 110, the cloud authentication management platform obtains the mail account from the user record;

Step 111, the cloud authentication management platform sends the two-dimensional code image to the terminal via a mail upon the mail account;

in Step 111, the terminal can be a mobile device, such as ipad, mobile phone, and the like, or PC (personal computer), etc.

Step 112, the terminal displays the two-dimensional image code in the mail when the terminal receives the mail;

Step 113, the mobile terminal token waits for receiving the two-dimensional code image scanned by the user;

Step 114, the mobile terminal token obtains the first activation response upon the two-dimensional code image after receiving the two-dimensional code image; execute Step 119;

Step 115, the cloud authentication management platform obtains the terminal number from the user record;

Step 116, upon the terminal number, the cloud authentication management platform sends the first activation response to the terminal corresponding to the terminal number via short message service;

in Step 116, the terminal refers to a mobile device which can receive short message and configure the mobile terminal token, for example, a mobile phone, etc.;

Step 117, after receiving the short message, the terminal displays the first activation response in the short message;

Step 118, the mobile terminal token activates a mechanism of receiving data, receives the first activation response; execute Step 119 when the first activation request includes the preset prefix identification is detected;

in Embodiment 1, after displaying, by the mobile terminal, the first activation response in the short message, the mobile terminal token receives the clicking of first activation response made by the user and activates the mechanism of receiving data; execute Step 119 when the first activation request includes the preset prefix identification is detected;

Step 119, the mobile terminal token obtains the preset domain, the enterprise identification and the activation request ID from the first activation response;

for example, the activation request ID obtained by the mobile terminal token from the first activation response is fasdcvxvdsafdsfzcxcsdfsdafcxz;

Step 120, the mobile terminal token obtains the terminal port number, obtains a URL for activation upon the preset domain, the enterprise identification and the terminal port number, accesses the cloud authentication server via the URL for activation, builds network data link with the cloud authentication server, generates a second activation request upon the activation request ID;

for example, the mobile terminal port number obtains the mobile terminal port number 1843, the preset domain and enterprise identification api-dfserv.cloudentify.com;

the obtained URL for activation is api-dfserv.cloudentify.com:1843, the mobile terminal token activates the URL for activation to access the cloud authentication server, builds network data link with the cloud authentication server, specifically TCP connection with the cloud authentication server; preferably, the data is transferred in form of JSON data;

in Embodiment 1, Step 120 further includes that the mobile terminal obtains a preset online activation request type, obtains the stored token identification code and token version number, invokes a system type obtaining function, obtains the system type of the mobile terminal, then perform mac check on the preset online activation request type, the activation request ID, the token identification code, the mobile terminal system type and the token version number to obtain a mac check code;

for example, the obtained terminal port number is 1843, the obtained preset online activation request type is 6, i.e. "reqtype":"6"; the obtained token identification code is 57987117827971672588, i.e. app_version":"2.5"; the mobile terminal system type obtained by invoking the system type obtaining function is Android system; then the mobile terminal system type is set to be 1, i.e. "os":"1"; if the obtained mobile terminal system type is IOS system, the mobile terminal system type obtained is set to be 2; the mac check code obtained by computing is e5326079df7912968bd599301a1b9efb360b0cc6; the second activation request generated upon the preset domain, the enterprise identification, the activation request ID and the terminal port number is:

{"os":"1","reqid":"fasdcvxvdsafdsfzcxcsdfsdafcxz","reqtype": "6","udid":"57987117827971672588",app_version":"2.5"," mac":"e5326079df79129b8bd599301a1b9efb360b0cc6"};

Step 121, the mobile terminal token sends the second activation request to the cloud authentication server via the network data link;

Step 122, after receiving the second activation request data, the cloud authentication server obtains the activation request ID from the second activation request, determines whether the activation request ID is correct and valid; if yes, execute Step 123; otherwise, report error and the procedure is ended;

in Embodiment 1, determining whether the activation request ID is correct and valid specifically includes: determining whether the activation request ID is identical to the activation request ID stored in the server storage area, if yes, the activation request ID is correct; otherwise, the activation request ID is not correct; determining whether the different between the system time of the server and the system time stored in the server storage is in a preset category, preferable is less than 120 s, if yes, the activation request ID is valid; otherwise, the received activation request ID is valid and delete the activation request ID in the server storage;

in the present Embodiment 1, the method further includes that the cloud authentication server obtains the token identification code and the mobile system type from the second activation request data, obtains the terminal device identification code and the mobile terminal system type which are stored in the server storage area upon the activation request ID and determines whether the terminal device identification code and the mobile terminal system are matched, if yes, execute Step 123; otherwise, report error and the procedure is ended;

Step 123, the cloud authentication server generates a token sequence number upon a token sequence number generating method, associates the token sequence number with the username and stores the token sequence number in the server storage area;

in Embodiment 1, before Step 123, the method further includes that the cloud authentication server determines whether a reactivation identification is obtained from the first activation request, if yes, no token sequence number is required to be regenerated and execute Step 124; otherwise, execute Step 123;

in Embodiment 1, preferably, an OTP cloud authentication center generates a token sequence number with length of 10 digits; in addition, the OTP cloud authentication performs preset computing on the username and generates the token sequence number;

Preferably, the method for generating token sequence number specifically includes: upon generating sequence of the token sequence number, generating a token sequence number according to order by starting adding 1 to 0000000001;

for example, the activated token sequence number is 1000000009; the token sequence number generated this time is 1000000010;

Step 124, the cloud authentication server invokes the random number generating function, generates a second random number and takes the second random number as seed generating factor;

in Embodiment 1, preferably, the OTP cloud authentication center invokes the random number generating function Random.nextInt(10), generates the second random number which is binary data with length of 10 digits and takes the second random number as the seed generating factor;

for example, the cloud authentication server generates the second random number, i.e. the seed generating factor is 30750849669824758444;

Step 125, the cloud authentication server applies a preset derivation algorithm to perform derivation on the seed generating factor and generates a server seed key;

in embodiment 1, preferably, the cloud authentication server applies PBKDF2 derivation algorithm, obtains the server seed key with 20 bytes; further, BF derivation algorithm etc. can be used;

for example, the cloud authentication server generates a second random number, i.e. the seed generating factor is 6595781253;

the server seed key obtained by performing derivation on the seed generating factor is
FB80ECDA5EDF464CF7715EE66A25ED079122D429;

Step 126, the authentication server obtains a corresponding enterprise key upon the username, uses the enterprise key to encrypt the server seed key, obtains the encrypted server seed key, associates the encrypted server seed key with the username and stores the encrypted server seed key in the server storage area;

Specifically, the authentication server encrypts the server seed key with the preset encryption algorithm upon the token sequence number, obtains the binary encrypted server seed key, converses the binary encrypted server seed key by using Base64, obtains a character string; preferably, the preset encryption algorithm is 3DES algorithm; in addition, the algorithm can be SM3, RSA etc.;

for example, the enterprise key obtained by the cloud authentication server is
1F3D4E3A12459372B8371931779137 82;

the encrypted server seed key obtained by that the enterprise key encrypts the server seed key and conversing is
PL96EUSWSdPP2gj8fr6m-YXBpLWE0OTJjN2Q3LmR1b3N1Y3VyaXR5LmNvbQ;

in Embodiment 1, process of generating the enterprise key stored in the cloud authentication server includes:

Step 1, a key maintaining platform receives an administrator key of a key holder;

in this case, the administrator key of the key holder should be modified regularly in order to assuring the security of the administrator key;

Step 2, the key maintaining platform performs preset computing on the administrator key, obtains a master key, stores the master key in the storage area;

Step 3, the authentication server obtains the master key from the key maintaining platform, determines whether the obtained master key is identical to a master key stored in the server storage, if yes, execute Step 4; otherwise, update the master key in the server storage area, execute Step 4;

in Embodiment 1, because the administrator key requires to be changed regularly, preferably, the cloud authentication server sends a request of obtaining the master key to the key maintaining platform every 2 minutes and receives a current master key returned from the key maintaining platform;

Step 4, the cloud authentication server obtains the corresponding enterprise ID upon the username and performs hash operation on the master key and the enterprise ID and stores the enterprise key in the server storage area;

in this case, the enterprise ID is allocated randomly by the cloud authentication management platform to an enterprise when registering administrator, and the enterprise ID is associated with a plurality of user names and stored in the server storage area;

in Embodiment 1, because the server seed key is encrypted with the enterprise ID, service seed keys of other enterprises can not be cracked when the server seed key is cracked; which has better security;

Step 127, the cloud authentication server uses a preset form way to generate a second activation response upon the token sequence number and the seed generating factor;

in Embodiment 1, preferably, the cloud authentication server encrypts the seed generating factor upon the token identification code and obtains an encrypted seed generating factor;

Step 127 further includes that the cloud authentication server obtains a password generating algorithm, sets algorithm ID upon the obtained password generating algorithm and obtains the current system time;

for example, the encrypted seed generating factor obtained by the cloud authentication server is 30750849669824758444; the obtained password generating algorithm is SM3 password generating algorithm; then the algorithm ID is set to be 00; if the obtained password generating algorithm is AUTH password generating algorithm, the algorithm ID is set to be 01; the mac check code is obtained by performing mac check code on the online activation request type, the activation request ID, the algorithm ID, the token sequence number, the encrypted seed generating factor, the user name, the enterprise identification and the serve system time;

further, the cloud authentication server forms response data upon the online activation request type, the activation request ID, the token sequence number, the encrypted seed generating factor, the username, the enterprise identification, the server system time and the mac check code, encrypts the response data with the preset agreed key to obtain the second activation response;

for example, the generating response data is

{"data":"pushtype":"6","reqid":"fasdcvxvdsafdsfzcxcsdfsdafcxz", "algid":"00","token":"1000000010","factor":"30750849669824758444", "userid":"abc","compname":"dfserv","time":"1417502589"};

the second activation response obtained by using the preset agreed key to encrypt the response data is {"data":"591f86917938bb30066991c78f1e2b4c63a125ea90 d8800418fa3e07dc2d1187f7c64bac023a34d7dc58dcf7c79e99fccc 874de6fba79a0eb50614fe73624d69b95fd92d3cf83c1d2894355e790 b2ff6dcce8892ed153681eb478521843eaf6f3a5623236754a7bb0b7d 709be74d79cd57a20d4a9af495e9c84918920dc0d1f94d032fd8f2baa 4e6d8c230b2802e7777a07e47fef374444b77412890c204fb729e6e10 fd7fa658db115c32f713b53e1bbbba92d366c0b69e7b70a87eeb564c 51","mac":"f09749aa775b9eb84c0931e7250c95ea84ec901a"};

Step 128, the cloud authentication server sends the second activation response to the mobile terminal token via the network data link;

Step 129, the mobile terminal token obtains the seed generating factor and the token sequence number from the second activation response;

Step 129 specifically includes that the mobile terminal token decrypts the second activation response data by using the preset agreed key, obtains the response data and generates the seed generating factor and the token sequence number from the response data;

in Embodiment 1, Step 129 further can be that the mobile terminal token obtains the encrypted seed generating factor from the second activation response, decrypts the encrypted seed generating factor by using the token identification code and obtains the seed generating factor;

before Step 129, the method further includes that the mobile terminal token obtains the activation request ID from the second activation response, determines whether the activation request ID is identical to the activation ID stored in the token, if yes, execute Step 129; otherwise, report error and the procedure is ended;

Step 130, the mobile terminal token performs derivation on the seed generating factor by using the preset derivation algorithm and obtains the token seed key;

for example, the mobile terminal token performs derivation on the seed generating factor and obtains the token seed key FB80ECDA5EDF464CF7715EE66A25ED079122D429;

Step 131, the mobile terminal token generates the dynamic password upon the token seed key, encrypts the token seed key with the token sequence number, obtains the encrypted token seed key and stores the encrypted token seed key and the token sequence number in the token storage area;

Step 131 further includes that the mobile terminal token obtains the algorithm ID from the second activation response, obtains a corresponding password generating algorithm upon the algorithm ID, obtains the server system time from the second activation response, computing the drift value between the server system time and the mobile terminal time, computing the token seed key and the built-in dynamic factor by using the selected password generating algorithm upon the drift value, generates the dynamic password;

for example, the corresponding password generating algorithm upon the algorithm ID is OATH time type algorithm; in addition, the password generating algorithm is time type SM3 cryptographic algorithm, etc., the generated dynamic password is 179059;

Step 132, the mobile terminal token generates a third activation request upon the dynamic password, the token sequence number and the activation request ID;

In Embodiment 1, preferably the mobile terminal token generates the third activation request upon the preset online activation request type, the activation request ID, result of successful activation or failed activation, the token version number, the token sequence number and the dynamic password;

for example, the generated third activation request is

{"result":"1","reqtype":"7","otp":"179059","token": "1000000010","reqid":"fasdcvxvdsafdsfzcxcsdfsdafcxz"};

in Embodiment 1 of the present invention, because a plurality of token application can be installed on one cellphone, each token application corresponds to a token sequence number; after that the mobile terminal token sends the token sequence number to the cloud authentication server, the authentication server obtains all information corresponding to the token sequence number; in addition, the cloud authentication server can obtain all information corresponding upon the activation request ID without obtaining token sequence number.

Step 133, the mobile terminal token sends the third activation request to the cloud authentication server via the network data link;

Step 134, after receiving the third activation request, the cloud authentication server obtains the activation request ID from the third activation request, determines whether the activation request ID is correct, if yes, execute Step 135; otherwise, report error and the procedure is ended;

Specifically, the cloud authentication server determines whether the activation request ID is identical to the activation request ID stored in the server storage area; if yes, the activation request ID is correct; otherwise, the activation request ID is not correct;

Step 135, the cloud authentication server obtains the encrypted server seed key and the enterprise key, decrypts the encrypted server seed key with the enterprise key, obtains the server seed key and generates the dynamic password upon the server seed key;

for example, the cloud authentication server obtains corresponding encrypted seed server key upon the username ft is
PL96EUSWSdPP2gj8fr6m-YXBpLWE0OTJjN2Q3LmR1b3N1Y3VyaXR5LmNvbQ;
the obtained enterprise key is
1F3D4E3A12459372B837193177913782;
the server seed key obtained by decrypting is
FB80ECDA5EDF464CF7715EE66A25ED079122D429;
the generated dynamic password is 179059;

Step 136, the cloud authentication server determines whether the generated dynamic password matches the dynamic password in the third activation request; if yes, execute Step 138; otherwise, execute Step 137;

Step 137, the cloud authentication server generates the third activation request of failed activation and execute Step 139;

Step 138, the cloud authentication server generates the third activation request of successful activation and execute Step 139;

Specifically, the cloud authentication server obtains the preset online activation result type, activation time and generates the third activation response upon the preset online activation type, the activation request ID, the activation successful result and the activation time;

for example, the third activation response of successful activation generated by the cloud authentication server is {"pushtype":"7","reqid":"fasdcvxvdsafdsfzcxcsdfsdafcxz", "result":"1","time":"1417502590"};

Further, Step 138 further includes that the cloud authentication server obtains the current system time and stores the current system time as last activation time;

Step 139, the cloud authentication server sends the third activation response to the mobile terminal token via the network data link;

Step 140, the mobile terminal token determines the third activation response, if the third activation response is successful activation, activation is completed and the procedure is ended; if the third activation response is failed activation, delete the encrypted token seed key, activation is failed and the procedure is ended;

in Step 140, when the activation is failed, the method further includes displaying information of failed activation; when the activation is successful, the method further includes that the mobile terminal token displays the information of successful activation.

Embodiment 2

Figure 4:
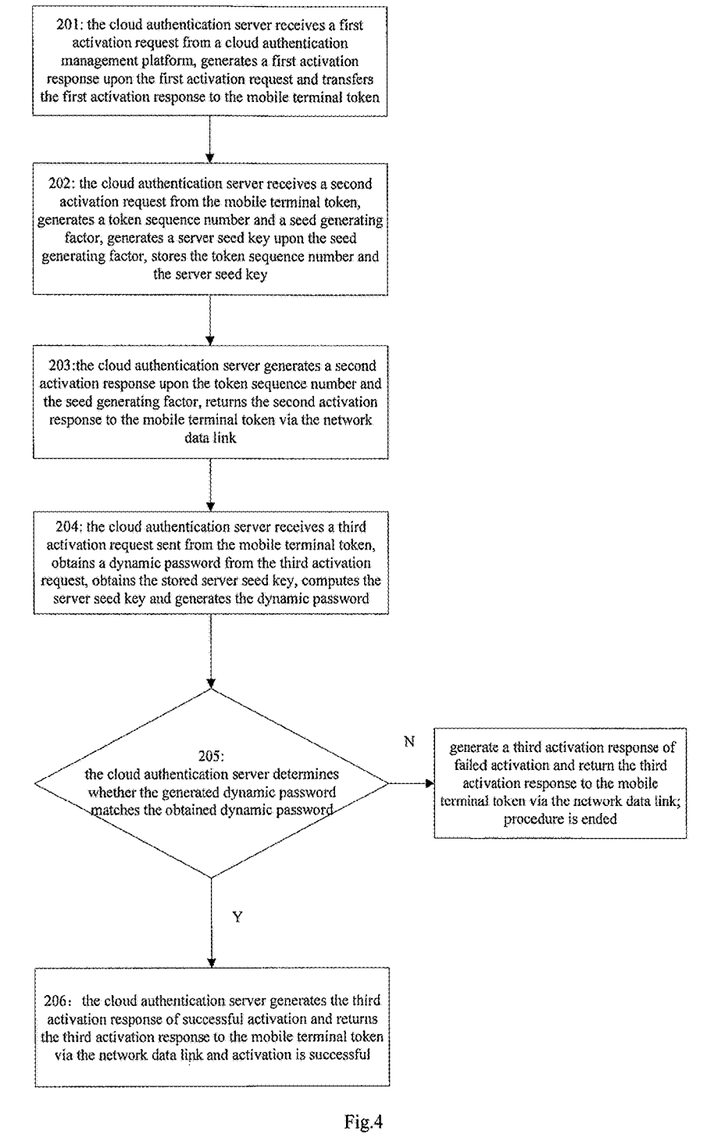
FIG. 4 is a flow diagram of a working method for a cloud authentication server in a system of online activating mobile terminal token.

As shown in FIG. 4, Embodiment 2 provides a working method for the cloud authentication server in the system of online activating mobile terminal token, which comprises:

Step 201, the cloud authentication server receives a first activation request from the cloud authentication management platform, generates a first activation response upon the first activation request and transfers the first activation response to the mobile terminal token;

specifically, generating the first activation response upon the first activation request and transferring the first activation response to the mobile terminal token specifically includes:

Step T1-1, the cloud authentication server obtains a username from the first activation request;

Step T1-2, the cloud authentication server obtains a preset prefix identification, a preset domain and an enterprise identification which correspond to the username; and Step T1-3, the cloud authentication server generates the first activation response upon the username, the preset prefix identification, the preset domain and the enterprise identification, transfers the first activation response to the mobile terminal token via the cloud management platform and the terminal;

Step 202, the cloud authentication server receives a second activation request from the mobile terminal token, generates a token sequence number and a seed generating factor, generates a server seed key upon the seed generating factor, stores the token sequence number and the server seed key;

before Step 202, the method further includes that the cloud authentication server determines whether a reactivation identification can be obtained from the first activation request, if yes, record the reactivation identification and execute Step 202; otherwise, execute Step 202 directly;

Step 202 specifically includes that the cloud authentication server receives the first activation request sent from the mobile terminal token, determines whether the reactivation identification is recorded, if yes, generates the seed generating factor, generates the server seed key upon the seed generating factor and stores the server seed key; otherwise, generates the token sequence number and the seed generating factor, generates the server seed key upon the seed generating factor and stores the token sequence number and the server seed key;

further, Step 202 further includes:

Step T2-1, the cloud authentication server receives the second activation request sent from the mobile terminal token, invokes random number generating function to generate a second random number, takes the second random number as the seed generating factor, generates a token sequence number upon a token sequence number generating algorithm;

Step T2-2, the cloud authentication server uses a preset derivation algorithm, performs derivation on the seed generating factor and obtains the server seed key; and Step T2-3, the cloud authentication server obtains the enterprise key, encrypts the server seed key with the enterprise key, obtains and stores the encrypted server seed key;

Step 203, the cloud authentication server generates a second activation response upon the token sequence number and the seed generating factor, returns the second activation response to the mobile terminal token via the network data link;

in the embodiment 2, generating the second activation response upon the token sequence number and the seed generating factor specifically includes that the cloud authentication server obtains the stored token identification code, encrypts the seed generating factor upon the token identification code, obtains the encrypted seed generating factor and generates the second activation response upon the token identification code and the encrypted seed generating factor;

Step 204, the cloud authentication server receives a third activation request sent from the mobile terminal token, obtains a dynamic password from the third activation request, obtains the stored server seed key, computes the server seed key and generates the dynamic password;

in Step 204, computing the server seed key and generating the dynamic password specifically includes:

Step T4-1, the authentication server obtains the corresponding enterprise key and the encrypted server seed key;

Step T4-2, the cloud authentication server decrypts the encrypted server seed key upon the enterprise key by using a preset decrypting algorithm and obtains the server seed key; and Step T4-3, the cloud authentication server computes the server seed key and a built-in dynamic factor and generates the dynamic password.

Step 205, the cloud authentication server determines whether the generated dynamic password matches the obtained dynamic password, if yes, executes Step 206; otherwise, generates a third activation response of failed activation and returns the third activation response to the mobile terminal token via the network data link; procedure is ended;

Step 206, the cloud authentication server generates the third activation response of successful activation and returns the third activation response to the mobile terminal token via the network data link and activation is successful.

Embodiment 3

Figure 5:
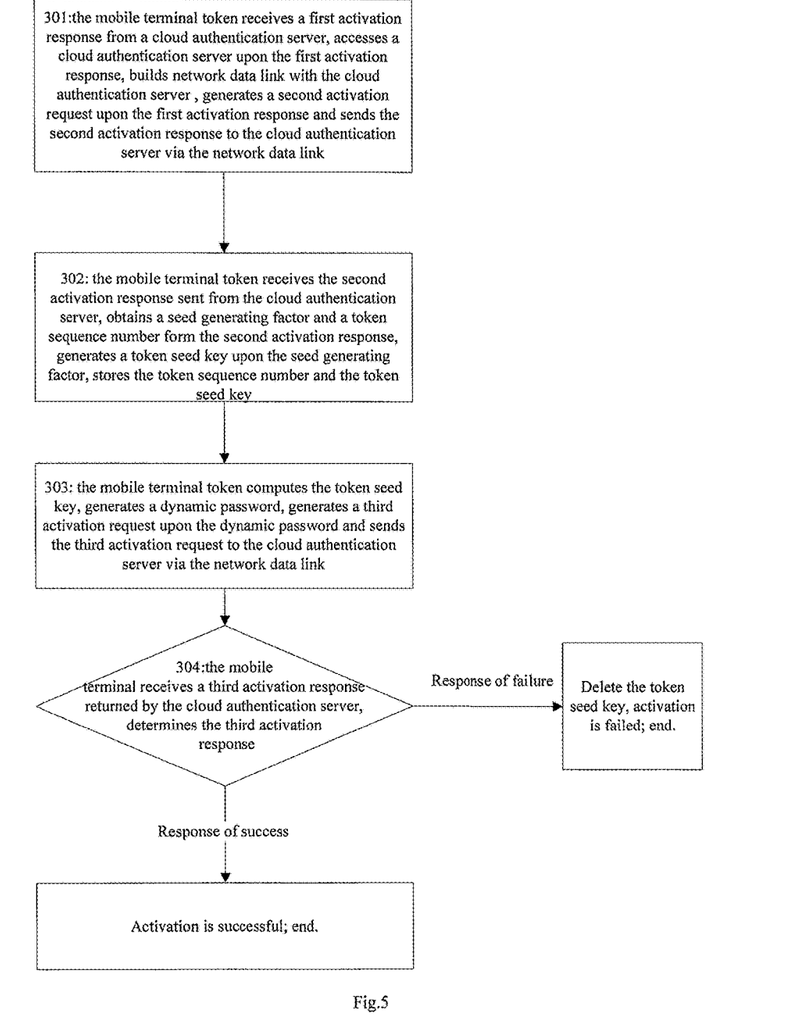
FIG. 5 is a flow diagram of a working method for a mobile terminal token in a system of online activating mobile terminal token.

As shown in FIG. 5, Embodiment 3 provides a working method for the mobile terminal token in a system of online activating mobile terminal token, which comprises:

Step 301, the mobile terminal token receives a first activation response from the cloud authentication server, accesses the cloud authentication server upon the first activation response, builds network data link with the cloud authentication server, generates a second activation request upon the first activation response and sends the second activation response to the cloud authentication server via the network data link;

in Embodiment 3, accessing the cloud authentication server upon the first activation response, building network data link with the cloud authentication server upon the first activation response specifically comprises that the mobile terminal token obtains a preset domain name and an enterprise identification from the first activation response, obtains a terminal port number, obtains a URL for activation, accesses the cloud authentication server via the URL for activation and builds network data link with the cloud authentication server;

receiving, by the mobile terminal token, the first activation response from the cloud authentication server specifically comprises: receiving a two-dimensional image generated by the first activation response, analyzing the two-dimensional image, obtaining the first activation response and starting a mechanism of receiving data, receiving the first activation response when data including a preset prefix identification is detected to be received; and generating the second activation request upon the first activation response specifically comprises: obtaining, by the mobile terminal token, a token identification code and a token version number, which are stored by the mobile terminal token, invoking a function of obtaining system type, obtaining a system type of the mobile terminal, generating the second activation request upon the token identification code, the token version number and the system type of the mobile terminal.

Step 302, the mobile terminal token receives the second activation response sent from the cloud authentication server, obtains a seed generating factor and a token sequence number form the second activation response, generates a token seed key upon the seed generating factor, stores the token sequence number and the token seed key;

Step 302 specifically includes:

Step X2-1, the mobile terminal token receives the second activation response sent form the cloud authentication server, obtains the seed generating factor and the token sequence number from the second activation response;

Step X2-2, the mobile terminal token generates the token seed key upon the seed generating factor; and Step X2-3, the mobile terminal token encrypts the token seed key with the token sequence number, obtains the encrypted token seed key, stores the encrypted token seed key and the token sequence number;

Step 303, the mobile terminal token computes the token seed key, generates a dynamic password, generates a third activation request upon the dynamic password and sends the third activation request to the cloud authentication server via the network data link;

in Embodiment 3, computing the token seed key and generating the dynamic password specifically includes:

Step X3-1, decrypting, by the mobile terminal token, the encrypted token seed key by means of the token sequence number, so as to obtain the token seed key; and Step X3-2, the mobile terminal token uses a password generating algorithm, computes the token seed key and a built-in dynamic factor and generates the dynamic password;

Step 304, the mobile terminal receives a third activation response returned from the cloud authentication server, determines the third activation response, deletes the token seed key if the third activation response is response of failure, activating is failed and procedure is end; activating is successful if the third activation response is response of success and procedure is end.

The described embodiments are only preferred embodiments of the application and the embodiments are not intended to limit the application. Any alteration or change easily obtained by those skilled in the art based on the application should fall in the scope of protection of the application.

The invention claimed is:

1. A working method of a system for online activating a mobile terminal token, characterized in that said working method comprises:

Step S1, receiving, by a cloud authentication server, a first activation request from a cloud authentication management platform, generating a first activation response upon the first activation request and returning the first activation response to the cloud authentication management platform;

Step S2, sending, by the cloud authentication management platform, the first activation response to a terminal;

Step S3, accessing, by the mobile terminal token, the cloud authentication server upon the first activation response, generating a second activation response request upon the first activation response, and sending the second activation response request to the cloud authentication server after receiving the first activation response from the terminal;

Step S4, generating, by the cloud authentication server, a token sequence number and a seed generating factor, generating a server seed key upon the seed generating factor, and storing the token sequence number and the server seed key after receiving a second activation request;

Step S5, generating, by the cloud authentication server, a second activation response, and sending the second activation response back to the mobile terminal token, upon the token sequence number and the seed generating factor;

Step S6, obtaining, by the mobile terminal token, the seed generating factor and the token sequence number from the second activation response, generating a token seed key upon the seed generating factor, and storing the token sequence number and the token seed key;

Step S7, computing, by the mobile terminal token, the token seed key and a built-in dynamic factor, generating a dynamic password, generating a third activation request upon the dynamic password, and sending the third activation request to the cloud authentication server;

Step S8, obtaining, by the cloud authentication server, the dynamic password from the received third activation request, obtaining and storing the server seed key, computing the server seed key and the built-in dynamic factor, generating the dynamic password, determining whether the generated dynamic password matches the obtained dynamic password, if yes, executing Step S9; otherwise, sending the third activation response of failed activation to the mobile terminal token; then ending; and Step S9, generating, by the cloud authentication server, the third activation response of successful activation, sending the third activation response back to the terminal token, and determining the activation as being successful.

2. The method of claim 1, wherein the cloud authentication management platform and the cloud authentication server are set in a device or different devices.

3. The method of claim 1, wherein in Step S1, generating the first activation response upon the first activation request specifically comprises: invoking, by the cloud authentication server, a random number generating function, generating a first random number, taking the first random number as an activation request ID and stores the activation request ID, and generating the first activation response upon the activation request ID;

in Step S3, generating the second activation request upon the first activation response specifically comprises: obtaining, by the mobile terminal token, the activation request ID from the first activation response and storing the activation request ID, and generating the second activation request upon the activation request ID;

in Step S4, after receiving the second activation request, the method further comprises: obtaining, by the cloud authentication server, the activation request ID from the second activation request, determining whether the activation request ID is identical to the stored activation request ID, if yes, going on a subsequent operation; otherwise, reporting error and ending the procedure;

in Step S5, generating the second activation response upon the token sequence number and the seed generating factor specifically comprises: generating, by the cloud authentication server, the second activation response upon the token sequence number, the seed generating factor and the activation request ID; and between Step S5 and Step S6, the method further comprises: obtaining, by the mobile terminal token, the activation request ID from the second activation response, determining whether the activation request ID is identical to the stored activation request ID, if yes, executing Step S6; otherwise, reporting error and ending the procedure.

4. The method of claim 1, wherein in Step S3, generating the second activation request upon the first activation response specifically comprises: obtaining, by the mobile terminal token, a stored token identification code and a token version number, invoking a system type obtaining function, obtaining a type of a mobile terminal system, and generating the second activation request upon a token identification code, the token version number and the type of the mobile terminal system;

after receiving the second activation request in Step S4, the method further comprises: obtaining, by the cloud authentication server, the token identification code, the token version number and the type of the mobile terminal system from the second activation request, obtaining the stored token identification code, token version number and type of the mobile terminal system, determining whether they are matched respectively, if yes, going on a subsequence operation, otherwise, reporting error and ending the procedure.

5. The method of claim 1, wherein before Step S1, the method further comprises:

Step b1, waiting, by the cloud authentication management platform, for receiving a user record, which is selected by an administrator, required to be activated;

Step b2, generating, by the cloud authentication management platform, the first activation request upon a username in the user record; and Step b3, sending, by the cloud authentication management platform, the first activation request to the cloud authentication server.

6. The method of claim 1, wherein Step S2 specifically comprises:

Step S2-1, receiving, by the cloud authentication management platform, the first activation response, and generating a two-dimensional code image upon the first activation response;

Step S2-2, obtaining, by the cloud authentication management platform, a corresponding mail account, and sending the two-dimensional code image to a mobile terminal via a mail upon the corresponding mail account; and Step S2-3, displaying, by the mobile terminal, the received two-dimensional code image; and in Step S3, obtaining, by the mobile terminal token, the first activation response specifically comprises: receiving and scanning, by the mobile terminal, the two-dimensional code image, analyzing the two-dimensional code image, and obtaining the first activation response.

7. The method of claim 1, wherein

Step S2 specifically comprises: obtaining, by the cloud authentication management platform, a terminal number, and sending the first activation response to a terminal corresponding to the terminal number via a short message upon the terminal number; and in Step S3, obtaining, by the mobile terminal token, the first activation response specifically comprises: activating, by a mobile terminal, a data receiving mechanism, and receiving the first activation response.

8. The method of claim 1, wherein Step S4 specifically comprises:

Step d1, invoking, by the cloud authentication server, a random number generating function, generating a second random number and taking the second random number as a seed generating factor, and generating a token sequence number upon a token sequence number generating algorithm and storing the token sequence number;

Step d2, using, by the cloud authentication server, a preset derivation algorithm, performing derivation on the seed generating factor, and obtaining the server seed key; and Step d3, obtaining, by the cloud authentication server, an enterprise key, encrypting the server seed key with the enterprise key, and obtaining and storing the encrypted server seed key.

9. The method of claim 1, wherein Step S6 specifically comprises:

Step S6-1, obtaining, by the mobile terminal token, the seed generating factor and the token sequence number from the second activation response, Step S6-2, generating, by the mobile terminal token, the token seed key upon the seed generating factor; and Step S6-3, encrypting, by the mobile terminal token, the token seed key with the token sequence number, obtaining the encrypted token seed key, and storing the encrypted token seed key and the token sequence number.

10. The method of claim 9, wherein, in Step S7, computing the token seed key and generating the dynamic password specifically comprises:

Step S7-1, decrypting, by the mobile terminal token, the encrypted token seed key with the token sequence number, and obtaining the token seed key; and Step S7-2, computing, by the mobile terminal token, the token seed key and built-in dynamic factor with a password generating algorithm, and generating the dynamic password.

11. The method of claim 1, wherein after Step S9, the method further comprises: determining, by the mobile terminal token, the third activation response after receiving the third activation response, if the third activation response is a response of successful activation, determining that the activation is successful, ending the procedure; if the third activation response is a response of failed activation, deleting the token seed key, determining that the activation is failed and ending the procedure.

12. A method of a cloud authentication server for working in a system of online activating a mobile terminal token, wherein said method comprises:

Step T1, receiving, by the cloud authentication server, a first activation request from a cloud authentication management platform, generating a first activation response upon the first activation request, and sending the first activation response to the mobile terminal token;

Step T2, receiving, by the cloud authentication server, a second activation request sent from the mobile terminal token, generating a token sequence number and a seed generating factor, generating a server seed key upon the seed generating factor, and storing the token sequence number and the server seed key;

Step T3, generating, by the cloud authentication server, a second activation response upon the token sequence number and the seed generating factor, and returning the second activation response to the mobile terminal token via a network data link;

Step T4, receiving, by the cloud authentication server, a third activation request sent from the mobile terminal token, obtaining an obtained dynamic password from the third activation request, obtaining the stored server seed key, computing the server seed key, and generating a generated dynamic password;

Step T5, determining, by the cloud authentication server, whether the generated dynamic password matches the obtained dynamic password, if yes, executing Step T6; otherwise, returning a third activation response of a failed activation to the mobile terminal toke, ending the procedure; and Step T6, generating, by the cloud authentication server, a third activation response of successful activation and returning the third activation response to the mobile terminal token via the network data link, activation being successful.

13. The method of claim 12, wherein in Step T1, generating the first activation response upon the first activation request, and sending the first activation response to the mobile terminal token specifically comprises:

Step T1-1, obtaining, by the cloud authentication server, a username from the first activation request, Step T1-2, obtaining, by the cloud authentication server, a prefix identification, a preset domain and an enterprise identification which are corresponds to the username; and Step T1-3, generating, by the cloud authentication server, the first activation response upon the username, the prefix identification, the preset domain and the enterprise identification, and transferring the first activation response to the mobile terminal token via the cloud authentication management platform and a terminal.

14. The method of claim 12, wherein before Step T2, the method further comprises: determining, by the cloud authentication server, whether a reactivation identification can be obtained from the first activation request, if yes, recording the reactivation identification, and executing Step T2; otherwise, executing Step T2 directly; and Step T2 specifically comprises: receiving, by the cloud authentication server, the second activation request sent from the mobile terminal token, determining whether the reactivation identification is recorded, if yes, generating the seed generating factor, generating the server seed key upon the seed generating factor and storing the server seed key; otherwise, generating the token sequence number and the seed generating factor, generating the server seed key upon the seed generating factor, and storing the token sequence number and the sever seed key.

15. The method of claim 12, wherein Step T2 specifically comprises:
Step T2-1, receiving, by the cloud authentication server, the second activation request sent from the mobile terminal token, invoking a random number generating function, generating a second random number, taking the second random number as the seed generating factor, generating the token sequence number upon a token sequence number generating algorithm, and storing the token sequence number;
Step T2-2, using, by the cloud authentication server, a preset derivation algorithm, performing derivation on the seed generating factor, and obtaining the server seed key; and
Step T2-3, obtaining, by the cloud authentication server, an enterprise key, encrypting the server seed key with the enterprise key, obtaining the encrypted server seed key, and storing the encrypted server seed key.

16. The method of claim 12, wherein
in Step T3, generating the second activation response upon the token sequence number and the seed generating factor specifically comprises: obtaining, by the cloud authentication server, a stored token identification code, encrypting the seed generating factor with the a token identification code, obtaining the encrypted seed generating factor, and generating the second activation response upon the token identification code and the encrypted seed generating factor.

17. A method of a mobile terminal token for working in a system of online activating a mobile terminal token, wherein said method comprises:
Step X1, receiving, by the mobile terminal token, a first activation response from a cloud authentication server, accessing the cloud authentication server upon the first activation response, building a network data link with the cloud authentication server, generating a second activation request upon the first activation response, sending the second activation request to the cloud authentication server via the network data link;
Step X2, receiving, by the mobile terminal token, a second activation response sent from the cloud authentication server, obtaining a seed generating factor and a token sequence number from the second activation response, generating a token seed key upon the seed generating factor, and storing the token sequence number and the token seed key;
Step X3, computing, by the mobile terminal token, the token seed key, generating a dynamic password, generating a third activation request upon the dynamic password, sending the third activation request to the cloud authentication server via the network data link; and
Step X4, receiving, by the mobile terminal token, a third activation response returned from the cloud authentication server, determining whether the third activation response is successful or not, if the third activation response is a failed response, deleting the token seed key, then prompting that activation has failed, ending the procedure; if the third activation response is a successful response, then prompting that activation is successful, then ending the procedure.

18. The method of claim 17, wherein in Step X1, accessing the cloud authentication server upon the first activation response, and the building network data link with the cloud authentication server specifically comprises: obtaining, by the mobile terminal token, a preset domain and an enterprise identification from the first activation response, obtaining a terminal port number, obtaining an URL for activating upon the preset domain, the enterprise identification and the terminal port number, accessing the cloud authentication server via the URL for activating, and building the network data link with the cloud authentication server.

19. The method of claim 17, wherein
in Step X1, receiving, by the mobile terminal token, the first activation response from the cloud authentication server specifically comprises: receiving, by the mobile terminal, a two-dimensional image generated upon the first activation response, analyzing a second two-dimensional image so as to obtain the first activation response; or
activating, by the mobile terminal token, a data receiving mechanism, and receiving the first activation response when detecting that the received data includes a prefix identification.

20. The method of claim 17, wherein generating the second activation request upon the first activation response specifically comprises: obtaining, by the mobile terminal token, a stored token identification code and a token version number, invoking a system type obtaining function, obtaining a type of a mobile terminal system, and generating the second activation request upon a token identification code, the token version number and the type of the mobile terminal system.

21. The method of claim 17, wherein Step X2 specifically comprises:
Step X2-1, receiving, by the mobile terminal token, the second activation response sent from the cloud authentication server, and obtaining the seed generating factor and the token sequence number form the second activation response;
Step X2-2, generating, by the mobile terminal token, the token seed key upon the seed generating factor; and
Step X2-3, encrypting, by the mobile terminal token, the token seed key with the token sequence number, obtaining the encrypted token seed key, and storing the encrypted token seed key and the token sequence number.

* * * * *